(12) United States Patent
Cookston

(10) Patent No.: US 8,956,997 B2
(45) Date of Patent: Feb. 17, 2015

(54) PLANT CONDITIONER COMPOSITION AND METHOD

(71) Applicant: Andrew Wilson Cookston, Denver, CO (US)

(72) Inventor: Andrew Wilson Cookston, Denver, CO (US)

( * ) Notice: Subject to any disclaimer, the term of this patent is extended or adjusted under 35 U.S.C. 154(b) by 192 days.

(21) Appl. No.: 13/712,301

(22) Filed: Dec. 12, 2012

(65) Prior Publication Data

US 2013/0097923 A1    Apr. 25, 2013

Related U.S. Application Data

(63) Continuation-in-part of application No. 12/930,205, filed on Dec. 30, 2010, now abandoned.

(51) Int. Cl.

| | |
|---|---|
| *C05G 3/02* | (2006.01) |
| *A01G 1/00* | (2006.01) |
| *A01G 7/00* | (2006.01) |
| *C05F 11/10* | (2006.01) |
| *C05G 3/00* | (2006.01) |

(52) U.S. Cl.
CPC  *C05G 3/02* (2013.01); *A01G 1/001* (2013.01); *A01G 7/00* (2013.01); *C05F 11/10* (2013.01); *C05G 3/007* (2013.01); *C05G 3/0076* (2013.01)
USPC ........................................ 504/101; 47/58.1 R

(58) Field of Classification Search
None
See application file for complete search history.

(56) References Cited

U.S. PATENT DOCUMENTS

| | | | |
|---|---|---|---|
| 6,159,262 A | 12/2000 | Tumbers | |
| 6,582,961 B1 | 6/2003 | Moon | |
| 7,906,131 B2 | 3/2011 | Brower | |
| 2007/0049496 A1* | 3/2007 | Messerschmidt et al. | .... 504/357 |
| 2007/0154565 A1 | 7/2007 | Zaghmout | |
| 2008/0166437 A1 | 7/2008 | Rosskopf | |

* cited by examiner

*Primary Examiner* — Mina Haghighatian
*Assistant Examiner* — Erin Hirt
(74) *Attorney, Agent, or Firm* — Roger A. Jackson

(57) ABSTRACT

A plant conditioner composition, a method of manufacture for the composition, and a method of use for the composition to be applied to a plant is disclosed, with the composition including a distilled water and at least two carbohydrates that are preferably found from the grouping of molasses, honey, and dextrose. Further included in the plant conditioner composition is a vitamin B component, an orange oil component, a lemon oil component, a tea tree oil component, a hydrogen peroxide component, and an organic detergent component. A derivative plant conditioner composition that additionally includes a sea salt, a sodium bicarbonate, a potassium bicarbonate, and a canola oil forms a plant mold reduction composition and a further derivative plant conditioner composition that has an increased concentration of hydrogen peroxide to act as a pre harvest composition for inducing plant shutdown for a selected time period.

12 Claims, 5 Drawing Sheets

US 8,956,997 B2

PLANT CONDITIONER COMPOSITION AND METHOD

RELATED PATENT APPLICATIONS

This is a continuation in part (CIP) patent application claiming priority from U.S. patent application Ser. No. 12/930,205 filed on Dec. 30, 2010 by Andrew Wilson Cookston of Denver, Colo., U.S.

FIELD OF THE INVENTION

The present invention generally relates to plant conditioner compositions, and further the method of making a plant conditioner composition, plus the method of using or applying the plant conditioner composition. More particularly the present invention plant conditioner composition is related to improving plant growth, health, and production; such as edibles or flowers of the plant in addition to reducing the deleterious effects of insects, molds, fungus, and the like upon plants.

DESCRIPTION OF THE RELATED ART

It has long been known that the growth in plants can be improved with fertilization, that by providing the plant with a ready source of the nutrients that it requires for optimal or near optimal growth. Further, plants can be susceptible to the negative effects of various insects, molds, fungus, and other parasitic species that can either consume the plant itself or act to interfere with the plant's ability to thrive by preventing the plant from receiving the nutrients it needs. The plant care market provides a number of products that can help accomplish the above identified plant needs, however, typically are in the form of a number of separate solutions or mixtures that need to be applied independently or separately, further, solutions that act to eliminate insects, mold, and the like, also have a potential to harm the plant, and must be used carefully. In addition, any solution or composition that helps the plant optimize its growth can also at the same time act to further attract insects, molds, fungus, and the like as they have a more readily available and larger quantity of plant to consume. Given the complexity of applying multiple solutions and/or mixtures to plants to accomplish the above goals it would be desirable to have an all-in-one solution to apply to the plant that would work to optimize growth and help to eliminate insects and mold, too much simplify the proper maintenance and care of plants. Also, given the high chemical content of typically available plant growth fertilizers that also attack insects, mold, fungus, and the like, it would also be desirable to have an all-in-one solution that would contain safer non-toxic ingredients that are organic in nature to further reduce any risk to humans or plants.

In looking at the prior art in this area, in United States Patent Application Publication Number 2008/0166437 to Rosskopf, et al., disclosed are methods for reducing pests (e.g., nematodes, oomycetes, fungi, viruses) in an object or area by applying to the object or area a pest reducing effective amount of a composition containing hydrogen peroxide, orange terpene oil, orange valencia oil, at least one non-ionic emulsifier, distilled water or deionized water. Rosskopf also discloses methods for treating gastrointestinal nematode infection in ruminant animals by administering to a ruminant animal in need of such treatment a therapeutically effective amount of a composition containing orange terpene oil, orange valencia oil, at least one non-ionic emulsifier, distilled water or deionized water, and optionally hydrogen peroxide. However, Rosskopf does not teach the use of two or more carbohydrates in the composition.

Continuing, in the prior art for U.S. Pat. No. 7,906,131 to Brower disclosed is a formulation for controlling a plants pathogens, including: a) a microbe mixture comprising *Bacillus subtilis*, *Bacillus licheniformis*, *Bacillus axotoformans*, *Bacillus megaterium*, *Bacillus coagulans*, *Bacillus pumulis*, *Bacillus thurengiensis*, *Bacillus stearotermophilis*, *Paenbacillius polymyxa*, *Paenibaccillus durum*, *Azotobacter chroococcum*, *Pseudomonas aureofaceans*, and *Pseudomonas fluorescens*; b) Kaolin clay; c) a yeast; d) a Yucca plant extract; and e) a calcium salt. Brower teaches the use of a dextrose and vitamin B in the composition, however, not teaching tee tree oil nor molasses in the composition.

Further, in the prior art in U.S. Pat. No. 6,159,262 to Tumbers disclosed is a fertilizer composition comprising a water soluble organic waste, which has been at least partially biodegraded under aerobic conditions, an anti-bacterial agent which can reduce the level of pathogenic bacteria in the waste, a wetting agent, and an odor control agent and water, wherein the anti-bacterial and odor control agents may be the same or different. Tumbers while teaching the use of insecticidal oils being specifically tea tree oil and molasses, does not teach the use to two or more carbohydrates.

Next, in the prior art in United States Patent Application Number 2007/0154565 to Zaghmout disclosed is a method of killing insects, nematodes, fungi, and/or other pathogens on plant tissue which includes: applying a solution that includes a substance wherein the substance is a substrate for a hydrogen-peroxide generating enzyme, wherein the substrate is an oxalic acid, glucose, citrate, or the like. In Zaghmout, there is no teaching for two or more carbohydrates to be used in the composition.

Continuing in the prior art in U.S. Pat. No. 6,582,961 to Moon, et al., disclosed are methods for improving plant quality and yield in the presence of pathogens. The method in Moon increases the levels of pathogenesis-related proteins, such as PR1, phenylalanine ammonia lyase, or plant cell wall proteins, such as hydroxyproline-rich glycoproteins, in a plant by contacting the plant with a plant systemic inducer and a reactive oxygen species, wherein the amount of the reactive oxygen species is sufficient to increase the amount of the pathogenesis-related protein above the level induced by the plant systemic inducer in the absence of the reactive oxygen species. In Moon, a preferred reactive oxygen species is peracetic acid; a preferred plant systemic inducer is salicylic acid. However, Moon does not teach the use of two or more carbohydrates to be used in the composition.

The present invention addresses these needs of improving the ease and convenience of plant maintenance by providing an all-in-one product that has the net effect of enhancing plant health and growth rates plus killing in various insects, mold, fungus, and other plant pests with the use of a natural and nontoxic organic product that is non-synthetic. Wherein the present invention is a plant conditioning composition that is easy to apply to the plant by having its own delivery or wetting agent, further to help deliver essential human nutrients for plants that generate consumable harvest products.

SUMMARY OF INVENTION

Broadly, the present invention is of a plant conditioner composition, a method of manufacture for the composition, and a method of use for the composition to be applied to a plant is disclosed, with the composition including a distilled water and at least two carbohydrates that are preferably found from the grouping of molasses, honey, and dextrose. Further included in the plant conditioner composition is a vitamin B component, an orange oil component, a lemon oil component, a tea tree oil component, a hydrogen peroxide component, and an organic detergent component. A derivative plant conditioner composition that additionally includes a sea salt, a sodium bicarbonate, a potassium bicarbonate, and a canola oil forms a plant mold reduction composition and a further derivative plant conditioner composition that has an increased concentration of hydrogen peroxide to act as a pre harvest composition for inducing plant shutdown for a selected time period.

The present invention includes the composition in the form of a liquid to be sprayed on plants to kill, or deter, certain insects including spider mites, and diseases like mold, fungus, and mildew. The plant conditioner composition also helps prevent plant infestation and disease and promotes plant growth by use of vitamins and carbohydrates and oils.

These and other objects of the present invention will become more readily appreciated and understood from a consideration of the following detailed description of the exemplary embodiments of the present invention when taken together with the accompanying drawings, in which;

DEFINITIONS

Figure 1:
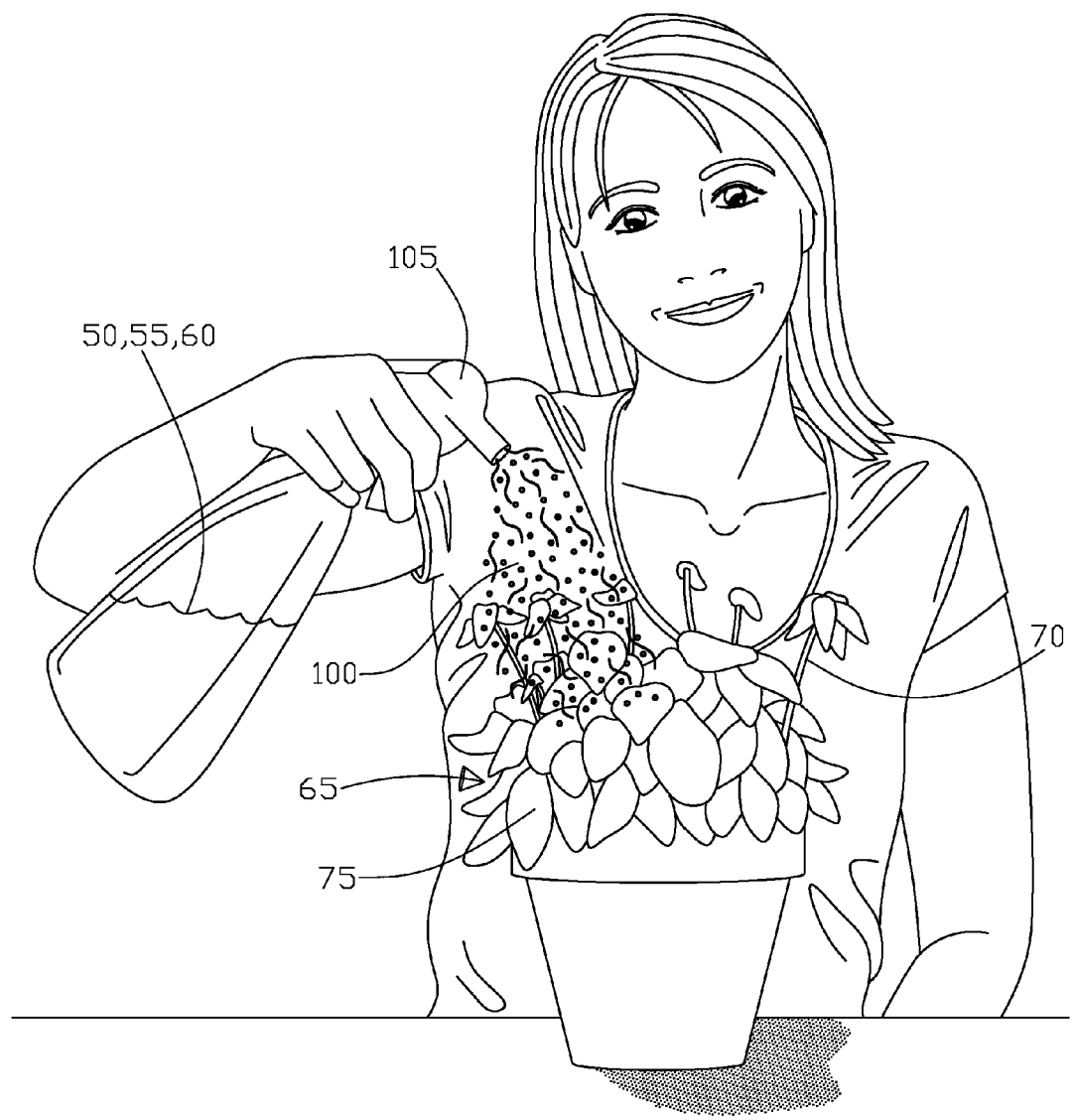
FIG. 1 shows a perspective use view of the plant conditioning composition being applied via the apparatus for selectively directing an atomized spray at the plant, particularly at the leaves and stalks.

DRAGON JUICE—brand name of the plant conditioner composition that includes a distilled water and at least two carbohydrates that are preferably found from the grouping of molasses, honey, and dextrose. Further included in the plant conditioner composition is a vitamin B component, an orange oil component, a lemon oil component, a tea tree oil component, a hydrogen peroxide component, and an organic detergent component, wherein the plant conditioner composition is applied to the plant up to twice daily. Thus the composition is designed to work by virtue of all the components together to accomplish a task or process. All the components do not necessarily do the designed task without the help of the other compounds or components. This combination of a "Net Effect" creates a more effective and complete all-in-one product composition which enhances the effect of all the components as a group in a complete working composition.

FIRE—brand name of the plant conditioner composition that includes a distilled water and at least two carbohydrates that are preferably found from the grouping of molasses, honey, and dextrose. Further included in the plant conditioner composition is a vitamin B component, an orange oil component, a lemon oil component, a tea tree oil component, a hydrogen peroxide component, an organic detergent component being the same composition as DRAGON JUICE, however, additionally including an increased amount of hydrogen peroxide to be applied to the plant only at about nine to ten days before harvest and at about four to five days prior to harvest in order to selectively initiate the harvest time period via causing the plant to move to a fall weather shutdown/harvest operational state. Thus the composition is designed to work by virtue of all the components together to accomplish a task or process. All the components do not necessarily do the designed task without the help of the other compounds or components. This combination of a "Net Effect" creates a more effective and complete all-in-one product composition which enhances the effect of all the components as a group in a complete working composition.

FLUSH—reduce the toxic waste in the plant from using artificial or synthetic nutrients, or a reverse chemical process, or over watering to reduce toxic build up from the plant and around the roots, and to restore the normal function of the roots.

NON-PHOTO TOXIC—opposite of Phototoxicity; a chemically induced skin or plant irritation requiring light (photoirritation or photosensitivity). The skin or plant leaf response resembles an exaggerated sunburn and discoloration showing damage to the surface.

NUTRIENT UPTAKE—most nutrients with the exception of carbon are taken up by the plant through its roots. All those brought through the roots, with the exception of hydrogen, which is derived from water, are taken up in the form of ions. Carbon, in the form of carbon dioxide, enters primarily through the leaf stomata. All the hydrogen utilized by the plant originates from soil water and participates with the carbon dioxide in the photosynthetic production of sugars and release of oxygen as a byproduct. Plants may have their nutrient needs supplemented by spraying a water solution of nutrients on their leaves, but nutrients are typically received through the roots.

PM2—brand name of the plant conditioner composition that includes a distilled water and at least two carbohydrates that are preferably found from the grouping of molasses, honey, and dextrose. Further included in the plant conditioner composition is a vitamin B component, an orange oil component, a lemon oil component, a tea tree oil component, a hydrogen peroxide component, an organic detergent component being the same composition as DRAGON JUICE, however, additionally including a sea salt, a sodium bicarbonate, a potassium bicarbonate, and a canola oil forming a plant mold reduction composition that is applied to the plant less frequently being no more than about once every six to ten days. Thus the composition is designed to work by virtue of all the components together to accomplish a task or process. All the components do not necessarily do the designed task without the help of the other compounds or components. This combination of a "Net Effect" creates a more effective and complete all-in-one product composition which enhances the effect of all the components as a group in a complete working composition.

SOIL DRENCH—a soil drench is chemical in a liquid form that is used to drench or wet the soil under a sick plant or tree. The chemical is directly absorbed by the roots of the affected plant and is trans-located throughout the plant.

STOMATA—In botany, a stoma is a pore, found in the plant leaf and stem epidermis that is used for gaseous exchange. The pore is bordered by a pair of specialized [parenchyma] cells known as guard cells that are responsible for regulating the size of the opening.

SYNTHETIC NUTRIENTS—non organic, or manmade chemicals, or artificial, or all natural nutrients for plants that are manufactured.

WETTING AGENT or termed Surfactants are compounds that lower the surface tension of a liquid, the interfacial tension between two liquids, or that between a liquid and a solid. Surfactants may act as detergents, wetting agents, emulsifiers, foaming agents, and dispersants.

REFERENCE NUMBERS IN DRAWINGS

50 Plant conditioning composition DRAGON JUICE standard
55 Plant conditioning composition PM2 mold reduction
60 Plant conditioning composition FIRE pre harvest
65 Plant
70 Stalk of plant 65
75 Leaf of plant 65
80 Underside of leaf 75
85 Topside of leaf 75
90 Area of soil about the stalk 70
95 Interface of the stalk 70 and soil 90
100 Atomized spray of the composition 50, 55, 50
105 Apparatus to selectively direct an atomizing spray 100 of the composition 50, 55, 60
110 Directing the spray 100 at the soil 90
115 Directing the spray 100 at the stalk 70
120 Directing the spray 100 at the leaf underside 80
125 Directing the spray 100 at the leaf topside 85
130 Grasping the stalk 70
135 Loose grip of stalk 70
140 Sliding the loose grip 135 along the stalk 70 away from the interface 95
145 Laterally exposing the leaf underside 80
150 Laterally exposing the leaf topside 85

DETAILED DESCRIPTION

Purposes and Advantages;

The present invention may have various embodiments, and variations and may be useful in different fields and for different purposes. The purposes and advantages of the more widely useful embodiments or variations of the present invention include, but are not limited to, the following, and may include other purposes and advantages in different fields of use not listed herein:

1. To provide a net effect product which kills various insects and plant pests.
2. To provide a product which does not harm or weaken the plant to which it is applied, to kill insects and pests while simultaneously enhancing the plants.
3. To provide a product which contains ingredients which make the plants grow better and stronger.
4. To provide a product which is natural, organic, and non-toxic, being non-synthetic.
5. To provide a product or nutrient supplement which could be used with or without synthetic fertilizers, organic fertilizers, or conventional insecticides without harm to the plant.
6. To provide a product which is inexpensive and easy to apply.
7. To provide a net effect all-in-one product which enhances overall plant health while killing or deterring insects and killing mold simultaneously.
8. To provide a product which kills mold and fungus on contact.
9. To provide a product including a delivery or wetting agent.
10. The product to deliver essential human nutrients not found in the human body via a symbiotic relationship with the plant. Thus causing products grown to be more nutrient efficient and consumable.
11. To provide a non-harmful product which could be used for head lice or human insect management because of its organic or natural nature.

The following embodiment or variation of the invention, but over time other embodiments and variations and uses in other areas may become preferred to those skilled in the art. A typical formulation (including one for the product called “Dragon Juice”) 50 would be as follows:

Ingredients Per Gallon:
Molasses=15 ml. minimum
Honey=7.5 ml.
Dextrose=7.5 ml.
H202=2-3 ml. 35% food grade
Orange oil=10 drops (available from NOW Foods, 395 S. Glen Ellyn Road, Bloomingdale, Ill. 60108)
Lemon oil=5 drops (available from Universal Herbs Inc. 33453 Western Ave., Union City, Calif.-94587)
Tea Tree Oil=¼-½ tsp. (available from Mountain Rose Herbs, PO Box 50220, Eugene, Oreg. 97405)
B-vitamin liquid=10 drops (available from Vitamin Institute, 12610 Saticoy Street South, North Hollywood Calif., 91605)
Organic Detergent=2 ml. (available from Seventh Generation Inc., 60 Lake Street Burlington Vt. 05401; antibacterial, biodegradable, chlorine free dish soap)

Finally enough distilled water is added to make 450 ml. from (1.5 oz.) total fluid concentrate per gallon. This concentrate is added to 1 gallon of distilled water and must be refrigerated at all times after diluting the composition concentrate in distilled. The concentrate must be shaken or mixed before separating into smaller containers.

The composition branded as Dragon Juice 50 helps eliminate spider mites and thirps-not necessarily killing all of them but deterring them and other insects as well. One can notice plant improvement in as little as two days and a complete plant health change in two weeks with the application of the composition. Although it kills mold or mildew as well, it does not prevent the plant from getting spores again due to environmental conditions. It can be used daily to maintain indoor mold or mildew problems to a minimum.

Operation of One Embodiment

Besides the hydrogen peroxide, the other components that help kill molds, fungus, and the like are the oils. The hydrogen peroxide kills more or less effectively based on the concentrate levels. The orange and lemon oils kill spider mites as well, but it is very strong and harsh to the plant if too much is used. The oil and hydrogen peroxide (H202) concentrations can be varied slightly as to not harm the plant itself or kill different type of insects. For example, to kill thrips, more H202 is needed, but fewer applications can be performed before plant damage starts to occur. As for the tea tree oil, it definitely kills mold and bacteria as well as insects and helps prevent the growth of spores. The anti-bacterial properties help counter the negative effects of the orange and lemon oils. Mixing it with the carbohydrates to stay on the leaves better creates a much heather environment on the leaf surface. The molasses also prevents a lot of insects from even getting on the plant. Ants and most outside insects stay away from molasses concentrated fluids. The honey is a carbohydrate and deters some insects as well and is an ant-bacterial element. The salt (see below) breaks down selenium which also aids in the nutrient and carbohydrate uptake. By breaking down the selenium in the water, it also helps the plant size and health. The organic detergent helps the mix and break down oils to infuse with water.

The carbohydrates are simple and complex sugars (a heat process is applied to the honey molasses and dextrose) which together make it easier for the plant to use the sugars resulting in more flavor and size in the final fruit of the plant stalk and leaves. The dextrose comes in a powder form and must be heated almost to a boiling point with distilled water as to break down the sugar so it will not re-crystallize or leave residue of Powdered dextrose on the plant. It also looks bad and the plant cannot absorb the powder. After heating, the dextrose breaks down as clear liquid close to boiling point. Then the honey and molasses are added and a small amount of distilled water while it is hot, adding the honey last so as to not hurt the living microorganisms in the honey. This is done to bind the sugar products together and to create a net of simple and complex sugars for the plants. Simple sugars are very fast to break down and complex sugars take more time. By offering the plant more options, it simply takes advantage of them. The carbohydrates help the nutrients uptake. The plant size is noticeably bigger. (The diluted carbohydrates can be put in the soil, or tank or create a spray, and plant size increases, but this is only part of the product). The B vitamins and tea tree oil also help greatly with plant growth and health. The honey and molasses have antibiotic qualities and deter insects and work well on plants. The detergents help infuse the components so the oils and water mix properly. Detergents are good for plants in small amounts as well. The combination of components has a stable shelf life. Being an organic product containing no enzymes, it can also be frozen and kept indefinitely.

Unlike most or all common insecticides, which cover only "killing or prevention", the present invention helps the physical plant condition as well. It is better because it is a complex mix to make the overall product stronger or more of an effective net than any average product like neem oil or pyrethrum. Even just using peroxide or any of the oils separately does not work as efficiently although all the ingredients work to kill insects, mold, mildew, bugs, and bacteria, to protect the plant. The combination is overall better than the average plant conditioner because of the way all the ingredients work together and create a net of overlapping plant support that is much more than an insecticide.

The H202 kills microorganisms as well as spider mites. Using the tea tree oil helps to kill other diseases and help the plant rejuvenate itself. Using both of these together stimulates the plants' strength. In combination with the acidic nature of the oils, the product helps the Ph. on the surface of the leaf. The Ph. level of the mix (Dragon Juice) 50 registers at 7.0-7.3, being slightly alkaline to help with molds. The B vitamins also enhance plant growth producing fuller leaves and larger fruit, being optionally added to the compound. The H202 also helps the plant by killing bugs and molds and then quickly breaking down and the compound is absorbed right into the plant causing part of the spider mite termination process to be less detrimental to the plants than neem oils or pyrethrum.

Based on this principle, the product composition 50 is less harmful and can be used around children and pets and on small sensitive vegetative plants to help with growth every day until late bloom and flower season. Because of its organic and natural properties, it has little negative effect on the plant unless one misuses it. It breaks down in a few days and can be easily washed off the plant while other chemicals or insecticides become part of the plants' chemistry and are detrimental to the plant quality and consumers.

One version of the product 50 is a foliar spray that is sprayed on the whole plant (top and bottom of the leaves), see FIGS. 1 to 5, from rooted stage to and including the flowers or fruit. It is used from beginning of small plants to end of plant cycles. All ingredients are organic and the product can be used with any other insecticides. It is non-toxic, non-phototoxic (can be used in day light or night light). The combination effect created by the listed components makes it more beneficial than common sprays. The ingredients are environmentally friendly and decompose quickly. The product composition 50 is much more than an insecticide and is also truly a plant conditioner.

Tests of One Embodiment

This product was tested in the Inventor's garden. At the time the garden was infested with spider mites and thrips. There were cob webs and major plant damage. The option was to destroy the garden. It seemed hopeless. Even after using neem oil and then using pyrethrum, it got worse and the plants started dying. By using "Dragon Juice" 50 there was an immediate change in the plants' heath and the bugs died upon contact with the spray. Originally the solution was too strong, and it severely damaged the plants and killed every living thing on the plants as well as the plants. After going back and testing each of the ingredients separately (a few weeks at a time over the course of five years) the Inventor concluded how much of each ingredient to use per gallon. After that, the Inventor combined the sugars and started adding each ingredient while testing shelf life and refrigerator life of Dragon Juice 50. After a few months most of the initial ingredients were proving to show good success and the spider mites were staying under control, although it did not kill the eggs unless the mix was so strong it would start to kill the plant as well. The concentrate variations have been tested in indoor and outdoor gardens. The results have been fantastic as all of the products produced have been getting outstanding customer approval for quality, and flavor. The average plant sizes have grown significantly and have nearly doubled the produce from the plants. Recently it was concluded that adding tee tree oil has helped to eradicate all the spider mites over a couple weeks rather than just keeping them under control. It also helps to keep the plant healthier from the stress of the concentrated oils. The salt (see below) is another last minute ingredient included after studying and talking with a state health inspector. The Inventor realized that the salt breaks down selenium in the water so the plant can use the nutrients and convert the use of sugars more effectively. As the H202 takes away microorganisms, the vitamins, and carbohydrates rebuild a healthy environment for the plants new growth. The molasses and honey also help to build new micro support for the plants. After testing, the Inventor uses the product every day.

The Inventor just started selling Dragon Juice 50 and has an average of $500-$1000 monthly sales and increasing. The product had a high kill rate on several plants tested, and clearly a higher rate of kill than products using various oils but not the hydrogen peroxide. The hydrogen peroxide produced bubbles of oxygen on the insects and appeared to make them explode or die quickly. The Inventor believes that the hydrogen peroxide causes much higher kill rates than other products based on oils. The Inventor observed that the other ingredients in the product caused the treated plants to grow better and healthier and to produce fruit or plant materials more satisfactory to humans.

Obvious testing by using a loop and magnifier concluded that the Dragon Juice 50 kills 100% of the spider mites, even after 6 weeks in the refrigerator. Thrips take longer to die and seem to leave the area and as to the thrips that were isolated, most eventually died after several hours. The Inventor tested more H202 and the tea tree oil combinations. The H202 again killed the thrips but started burning the leaves by putting in too much. The tee tree works better as it did not hurt the plant as bad and immediate success was apparent. The thrips went away in a couple days and the spider mites started to totally eradicate themselves.

The Inventor did two separate customer surveys to test the quality and flavor of the fruit. There was a customer survey based on quality and plant taste in comparison to the same plants grown without using Dragon Juice 50. The results were very conclusive as every participant could tell the difference and was impressed to find out that the positive differences were related to Dragon Juice 50 being applied. The Inventor's store has 300 regular customers and 400-500 other customers. In an economy where new customers are hard to find, the Inventor has a great reputation for having the best products available and is gaining new customers because of the Dragon Juice 50. Dragon Juice 50 is the tool that makes hydroponic and soil growing a guaranteed success. The Inventor also offers a 100% satisfaction guarantee and has had no returns as to date.

The Inventor has observed that it is dangerous and not recommended to use neem oils (found in other insecticides) in the last weeks of plant flowering due to the oils always causing a distasteful fruit flavor and causing plant damage in most cases. Pyrethrum is toxic and should not be used in food production (although is used widely) and causes negative effects to the plant and the consumer in every case. These are the most common competitors to Dragon Juice 50, and they do not do the job as effectively. They are cheaper to produce and do less good for the plants. In the opposite of these harsh elements, Dragon Juice can be used on the last days before harvest (which is unheard of because of synthetic applications becoming systemic and or more carcinogenic they cannot be used legally) because it is water soluble and non-toxic. Because of the natural and organic human consumable ingredients, the plant can be sprayed with Fire 60, or PM2 55, or Dragon Juice 50 and rinsed off immediately before or immediately after harvesting a plant without negative effects that other products have or create by using them on the last days of harvest prior to consuming the harvest products.

Additional Embodiments

By simplifying the mix one could simply mix H202 and orange oil and soap for the most basic concept of the insecticide. This basic solution can also be used as a cleaner and disinfectant. This mix will kill spider mites and some bugs and will not be much help to the overall plant health.

The above concentrate can be varied by removing tea tree oil and substituting more H202 for insect and micro-organism balance or production costs. The tea tree oil also helps balance the plant's health more efficiently by natural antibiotics to prevent and kill mold and mildew (also reduces plant stress and allows for better, healthier, and faster growth). The B vitamins also add to stress reduction and health. The H202 kills mold and mildew also, but too much H202 will kill too many beneficial micro-organisms. The amount of H202 could vary considerably depending on the insect to be killed and the plant's tolerance for H202.The other ingredients in the list above could be varied so as to effectively kill particular insects while at the same time avoiding any adverse effect on the particular plant, and avoiding using too much of an ingredient and thus excess cost. The invention includes many variations of ingredients and concentrations for particular plants, and particular insects to be killed. A wide range of plants and insects may require substantial changes in the percentage of ingredients in order to get, simultaneously, effective insect kill, avoid harming the plant and avoid wasting ingredients. There might be an upper limit to the vitamin B mixture beyond which further benefit to a particular kind of plant is not seen. Optional additives: salt (Dead Sea or Epsom) ¼-½ tsp. per gallon—breaks down selenium; anti-bacterial soap=2 ml. Adding anti-bacterial soap will aid in mold extermination.)

Alternative Embodiments

The Dragon Juice 50 is concentrated for packaging and shipping costs. The product is designed for foliar spray use and can be diluted to resale. The concentrated version will have a long shelf life and must be refrigerated after dilution in water at all times. The product works very well in this form to use as a soil conditioner. The concentrate can be diluted down and used as a tank or soil conditioner also.

The brand name FIRE 60 is the composition mix that can be changed to the point that it shuts down the plant by adding more H202.There is a unique reason to do this. By causing the plant to go into a fall or shut down mode, it causes overstimulation stress on the plant and causes the leaves to turn colors and the plant retracts its chlorophyll. Thus the plant stops overall growth processes and makes a last effort to create energy for the fruit or the flowers. The lack of chlorophyll production causes the overall flavor and plant odor to increase enough noticeably for investigation of this as a new concept of harvesting. This varied product is called "Dragon Fire" 60. It controls the plants harvest time and fruit quality by telling the plant when to shut down. After a few days the plant will slow down and start losing its green color.

Figure 2:
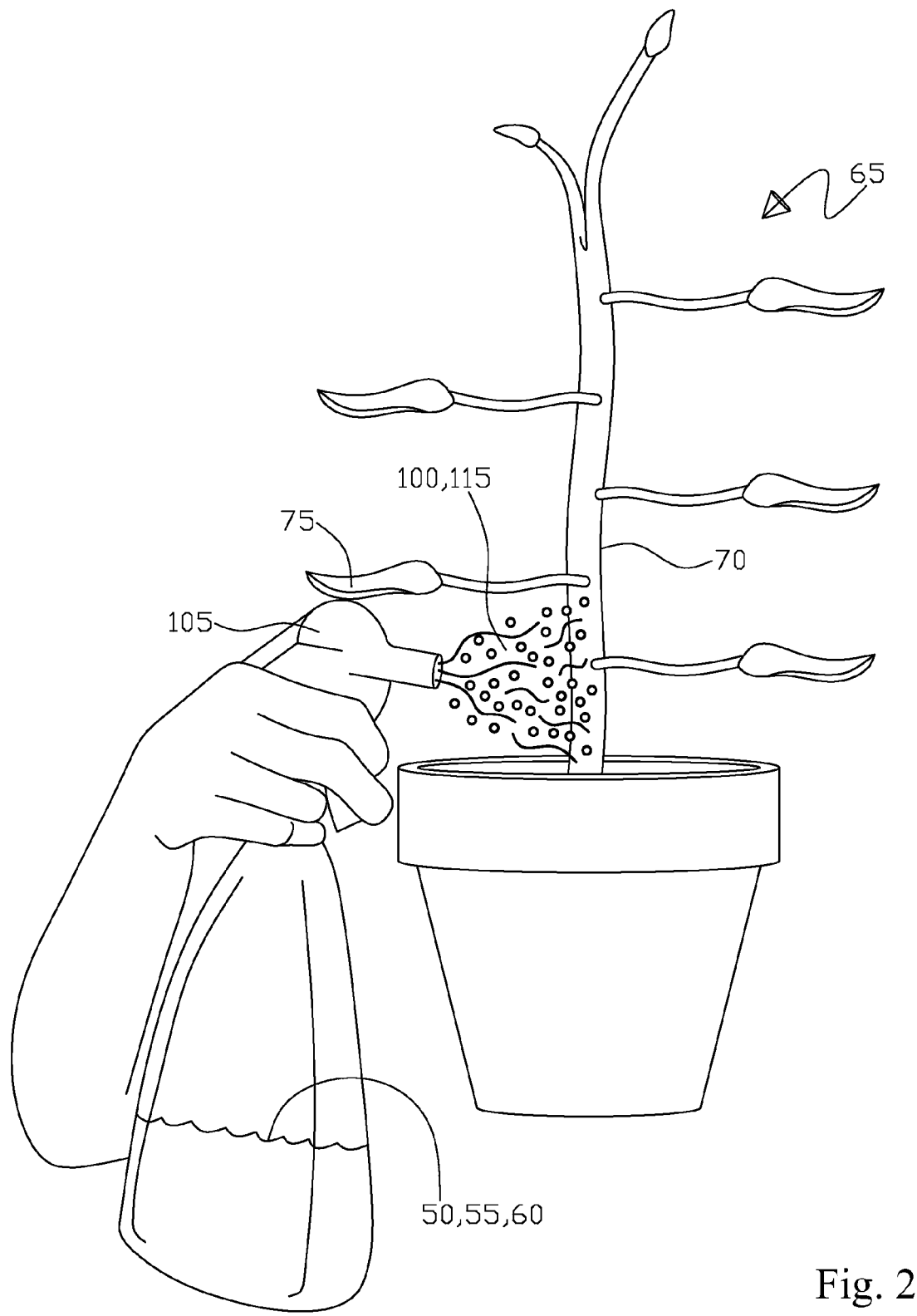
FIG. 2 shows a perspective use view of the plant conditioning composition being applied via the apparatus for selectively directing an atomized spray at the plant stalk in particular.
Figure 3:
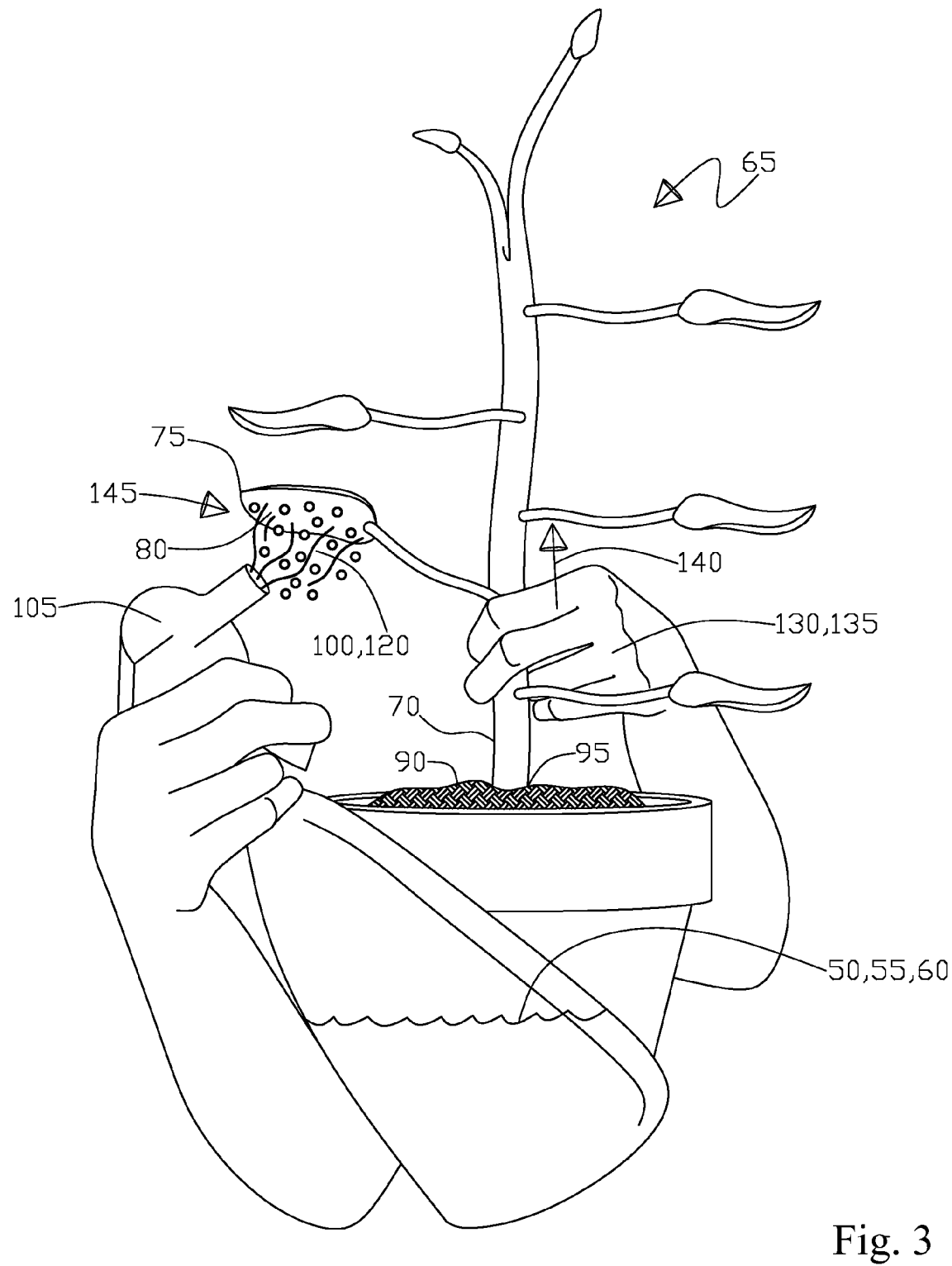
FIG. 3 shows a perspective use view of the plant conditioning composition being applied via the apparatus for selectively directing an atomized spray at the plant leaf underside in particular by the sliding of a loose grip from a griping of the plant stalk, wherein the sliding direction is away from the interface of the stalk and the soil.
Figure 4:
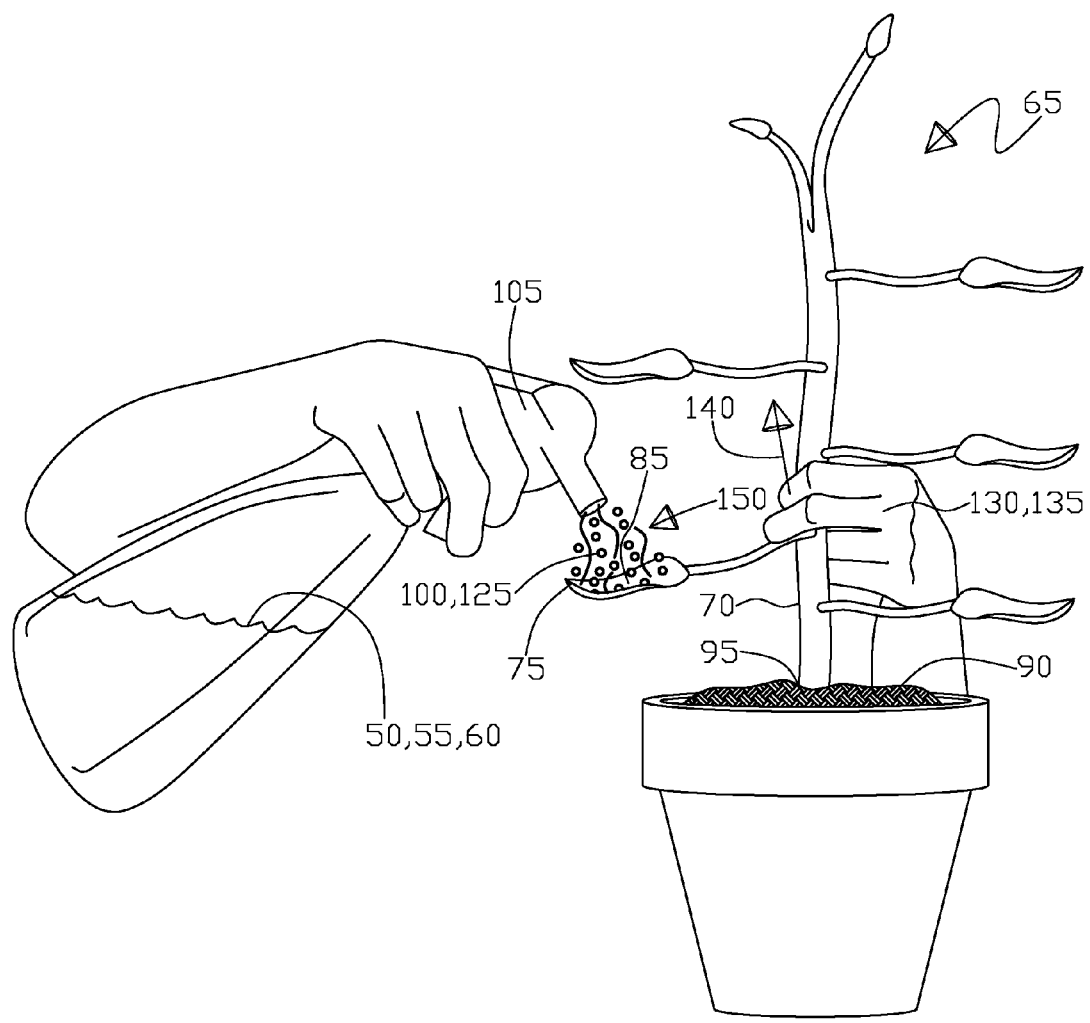
FIG. 4 shows a perspective use view of the plant conditioning composition being applied via the apparatus for selectively directing an atomized spray at the plant leaf topside in particular by the sliding of a loose grip from a griping of the plant stalk, wherein the sliding direction is away from the interface of the stalk and the soil.
Figure 5:
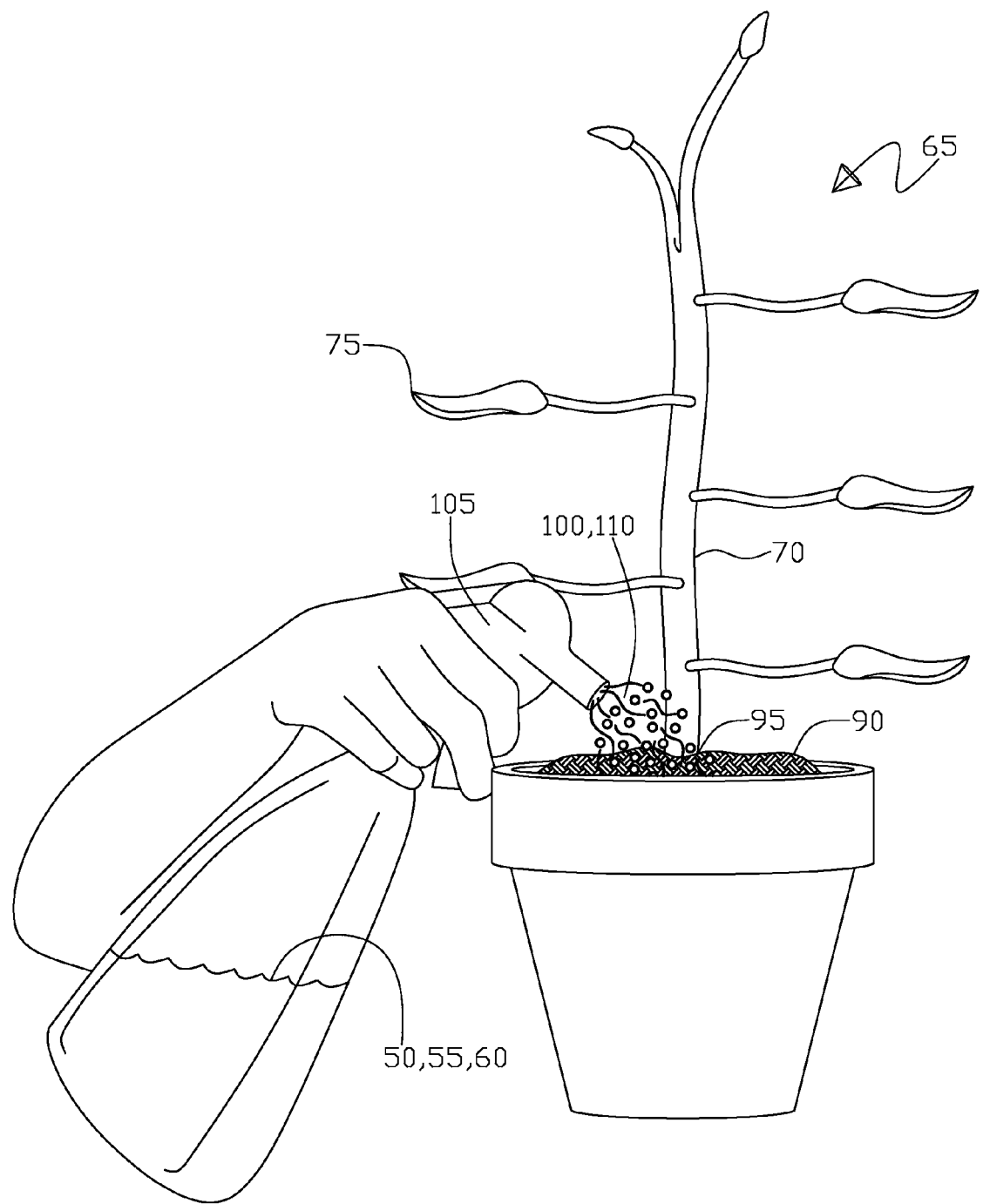
FIG. 5 shows a perspective use view of the plant conditioning composition being applied via the apparatus for selectively directing an atomized spray in particular at the soil area surrounding the stalk.

Starting with FIG. 1 shown is the perspective use view of the plant conditioning composition 50, 55, 60 being applied via the apparatus 105 for selectively directing an atomized spray 100 at the plant 65, particularly at the leaves 75 and stalks 70. Further, FIG. 2 shows a perspective use view of the plant conditioning composition 50, 55, 60 being applied via the apparatus 105 for selectively directing 115 an atomized spray 100 at the plant 65 stalk 70 in particular. Continuing, FIG. 3 shows a perspective use view of the plant conditioning composition 50, 55, 60 being applied via the apparatus 105 for selectively directing 120 an atomized spray 100 at the plant leaf underside 80 in particular by the sliding 140 of a loose grip 135 from a griping 130 of the plant stalk 70, wherein the sliding 140 direction is away from the interface 95 of the stalk 70 and the soil 90. Next, FIG. 4 shows a perspective use view of the plant conditioning composition 50, 55, 60 being applied via the apparatus 105 for selectively directing 125 an atomized spray 100 at the plant leaf topside 85 in particular by the sliding 140 of a loose grip 135 from a griping 130 of the plant stalk 70, wherein the sliding 140 direction is away from the interface 95 of the stalk 70 and the soil 90. Further, FIG. 5 shows a perspective use view of the plant conditioning composition 50, 55, 60 being applied via the apparatus 105 for selectively directing 110 an atomized spray 100 in particular at the soil area 90 surrounding the stalk 70.

Method of Making

DRAGON JUICE 50 Plant conditioner and fertilizer (standard base recipe)
120 gallon mix recipe (Part one carbohydrates)
DRAGON JUICE recipe makes 120 gallon concentrate bottles—1.5 oz. each
Distilled water is a priority for the mix—no substitutes
To make @ ½ gal of Carbohydrates (part one):
4 cups Dextrose powder in container to heat with then add
1 cup distilled water—heat until Dextrose is clear in water (6-9 min.) 190 degrees max do not overheat (over heating will caramelize dextrose. Under heating will cause crystallization of product on the shelf.)
Add 6 cups molasses and be sure to cool dextrose and molasses mixture below 100 degrees Fahrenheit
2 cups honey
Again, 90-100 degrees is within the biological norm for honey; do not compromise the integrity of the honey with heat.
Then add 12½ more cups of distilled water Note: distilled water must be added when the mixture is above 70 degrees Fahrenheit. A more noticeable reaction will occur if the distilled water is added after the mixture cools too much.
Then add ½ oz. vitamin B (which is 5-7 drops per gallon—Optional) 20 ml Vitamin B complex
Then add ¼ teaspoon of sea salt (optional)
120 Gallon Mix Recipe (Part Two Oils)
1 oz. orange oil (for spider mites)
⅓ oz. or less lemon oil (which is 3-5 drops per gallon) (Use ¼ oz. if you see leaf burn)
5 oz. Tea Tree=¼-½ Tsp. per gal=5-10 oz. (cut back for leaf burn)
Mix all oils separately then and add to carbohydrate mix and water
In separate bowl or jug mix 6 oz. of $H_2O_2$—35% (or 150 mL)
Use 3 oz. Organic Detergent—add to solution after the oils are added. Mix thoroughly and completely before adding detergent.
3 oz. organic detergent (which is 90 mL per gallon). Be sure all other ingredients are well mixed before adding detergent or reaction will occur and make a mess.
Mix and mix thoroughly! Ingredients are active at this point.
For best results; Contents must be stored in vented containers and mixed daily (stir or shake up containers) for 6-10 days consecutively until all off gassing is complete. Recap containers after mixing. When the bottles or gas subsides the test bottle will start to concave. You only need one test bottle to determine this. Wait two more days. At this point the solution should not expand or contract in the container. Finally the product can be bottled for resale.
After mix is complete and settles one week add approximately 2-3 cups more distilled water to make 180 ounces total concentrate.
This is the concentrate form of dragon juice is broken down into 1.5 ounce concentrates per gallon of distilled water for foliar spray applications.
For storage or downsizing into any containers—continuously mix as you divide.
Vented caps are optional.

Ingredients for One Concentrated Gallon Including Minimum and Maximum Measures
Ingredients per one gallon concentrate mix (makes approximately 1.5 fluid ounces) and Minimum and Maximum amounts to be used. Less than Minimum shows little or no benefit to the plant. Maximum amounts to be used show some to severe plant damage.
Dextrose=7.5 ml or ¼ oz.—Minimum 3.5 ml. to 15 ml. maximum—Less than minimum show little or no effect on the plants. Using more than maximum leaves too much residue on plants and eliminates the daily use design and begins to suffocate the plants processing capacity
Molasses=15 ml or ½ oz.—Minimum 3.5 ml. to 30 ml. maximum—Less than minimum show little or no effect on the plants. Using more than maximum leaves too much residue on plants and eliminates the daily use design and begins to suffocate the plants processing capacity
Honey=7.5 ml or ¼ oz.—Minimum 3.5 ml. to 15 ml. maximum—Less than minimum show little or no effect on the plants. By using more than maximum leaves too much residue on plants, and eliminates the daily use design, and begins to suffocate the plants processing capacity. Used also as an antibacterial for plant health.
This Carbohydrate compound is a net effect design to have simple to complex carbohydrates available to "seed" the nutritional process. Dextrose being a "level 1 sugar" starts the seeding process of nutrient take up while the molasses offers and delivers essential human nutrients as well as level 2 sugars to process. Therefore DRAGON JUICE 50 creates a symbiotic relationship with you and the plant. This Compound also produces micronutrients for the plants.
DRAGON JUICE has essential human nutrients not found in the human body or in most plants. By using DRAGON JUICE on your plants it creates a symbiotic or nutrient relationship with you and the plant. When the plant is consumed it gives your body a better nutritional value or "sugar". This value is the opposite of synthetic plant fertilizers that give you less nutrition sustainability. The Plants grown with DRAGON JUICE also Produce a more humanly digestible product.
Distilled Water=15 ml or ½ oz.—Minimum 5 ml. to 20 ml. maximum—less than 5 ml per gallon make the concentrate mix much more volatile to expanding and contracting and off gassing. Too little water makes the concentrate hard to ship because it expands and contracts too much for safety and shelf appeal in the bottle. Less distilled water also causes some plastic containers to bulge or bubble. Too much Distilled water will activate the product and start fermentation which greatly reduces shelf life.
Only Distilled Water must be used in this process because contaminates in regular drinking water have too much chlorine, ammonia, and other impurities to create a stable compound with long shelf life. Also other chemicals degrade the designed plant benefits.
Vitamin B=5 drops (optional)—Minimum 0 drops to 8 drops maximum—This component is optional to use—less than 1 drop has no visual effects. More than 8 drops shows plant stress increases and starts to burn the plant by overdosing the mixture.
Orange Oil=8 drops—Minimum 3 drops to 12 drops maximum—less causes the plant to show little to no response to the carbohydrates. The oil stimulates the leaf, stomata, stems and roots to uptake the carbohydrates and nutrients. The "oil mix" is also designed to help break down synthetic additives in the soil or growing medium such as synthetic nitrogen's. Too much oil will suffocate and burn the plant.

Lemon Oil=3 drops—Minimum 2 drops to 8 drops maximum—less causes the plant to show little to no response to the carbohydrates. The oil stimulate the leaf, stomata, stems and roots to uptake the carbohydrates and nutrients. The "oil mix" is also designed to help break down synthetic additives in the soil or growing medium such as synthetic nitrogen's. Too much oil will suffocate and burn the plant.

Tea tree oil=8 drops=Minimum 3 drops to ½ teaspoon drops maximum—less causes the plant to show little to no response to the carbohydrates. The oil stimulates the leaf, stomata, stems and roots to uptake the carbohydrates and nutrients. The "oil mix" is also designed to help break down synthetic additives in the soil or growing medium such as synthetic nitrogen's. Too much oil will suffocate and burn the plant. The tea tree oil also works as an antibiotic, kills mold and mildew. Too little has no benefit.

The Oil Compound is designed to be another net effect product that does not "kill" very well. The net effect is what specifically does the killing. Too much oil will cause severe plant problems. By mixing small amounts of oils, it becomes beneficial to stimulating the plants health and nutrient uptake process. This complex oil process also encourages and causes more essential oils and trichomes to be produced by the plant. Increased flavor in all food products grown with Dragon Juice. It also causes hot peppers to be hotter because of the oil stimulation.

Organic Detergent=1-2 ml=Minimum 1 ml. to 4 ml. maximum—Less causes the carbohydrates and oil compounds not to bind together properly. Too much causes the oils to break down too much and the mix loses most of its beneficial property and makes the composition detrimental to the plants health. Detergents (phosphates) are good for plants in smaller amounts.

$H_2O_2$ Hydrogen Peroxide =8 drops =Minimum 3 drops to ½ oz. maximum —less causes the plant to show little to no response to the carbohydrates. It will not help kill (bugs or other plant problems) as a net effect product. Too much will cause the plant to die. Using up to ½ oz. per gallon mix will cause the plant to stop taking up nutrients and cause the plant to use the remainder of the nutrients in the plant itself. This design will allow the plant to be harvested sooner on a day you pick rather than a day that is natural for the normal harvest of that plant. $H_2O_2$ will also deter and kill bugs by itself by adding or subtracting the $H_2O_2$ values. This design also releases the free radical into the compound benefiting the plant.

PM2 55 Composition Mixture;

If using the optional ingredients: Additional oil and bicarbonates bicarbonates and oils must be added before the detergents. A controllable reaction will occur. If the detergents are present, it reacts much more and takes longer to finish settling on the shelf.

Sea Salt (optional)=¼ tsp.=Minimum 0 drops to ¼ tsp. maximum. Salt helps break down the selenium. Too much will burn the plant.

Sodium Bicarbonate (optional) =1 tsp. =Minimum 0 to 1 tablespoon maximum. This is an optional additive to further control molds and fungus. Bicarbonates break down the negative charge on fungus and mold spores. Also bicarbonates release carbon dioxide to the plant. Too much bicarbonate will change the pH levels on the surface of the leaf. The plant will show signs of stress after several consecutive applications.

Potassium Bicarbonate (optional) 1 tsp.=Minimum 0 to 1 tablespoon maximum. This is an optional additive to further control molds and fungus. Bicarbonates break down the negative charge on fungus and mold spores. Bicarbonates release carbon dioxide to the plant. Potassium is also released for the plant.

Canola Oil (optional)=10 ml=Minimum 0 to 15 ml. maximum. This is an optional additive to further aid the mold and fungus prevention by coating the leaf with more oils than what is the standard recipe described here in this document. This amount of oil is strong enough to start suffocating leaves if used more than three consecutive days. Using Bicarbonates and oil together it reduces spores much more effectively than using bicarbonates alone with water. There is a visual difference. Spores die and disappear in front of your eyes. This combination helps prevent mold from coming back to the plant for a longer period of time.

Method of Use

To apply DRAGON JUICE 50 per directions use the following recommendations and refer to FIGS. 1 to 5;

Normal Application

DRAGON JUICE 50 is used as a foliar spray. To get best results you must completely wet the plant 65 on both sides 80, 85 of the leaves 75 by:

a) Starting at the bottom or base stalk 70 of plant spray 100 and soak the entire base of the plant allowing overspray to lightly wet surrounding soil also, see FIGS. 2 and 5.

b) Hold 130 smaller plants 65 by the base stalk 70 and encompass and gently lift 140 the leaves 75 while spraying both the bottom 80 and top 85 by letting the leaves 75 slowly fall back into their normal position as your hand moves up through the plant 65 thus wetting both sides 80, 85 of the leaf 75. After doing this on one side, rotate the plant 65 one-hundred eighty degrees and do the same process again to insure the plant 65 is wet on the stalk 70, both sides 80, 85 of the leaves 75. If the plant 65 has open flowers, spray the flowers on all sides as well. On larger plants 65 start at the main stalk 70 of the plant 65 and work your way out from the base of each branch. Start at the bottoms of the plants 65 and work your way to the top of the plant 65. This purpose is to prevent the plant 65 from allowing most small insects including, mites, thrips, aphids, termites, lice and other soft bodied insects from infesting anywhere on the surface the plant. Dragon Juice 50 is designed to repel insects and fungus by the wetting agent design. Also Dragon Juice 50 is designed to kill some insects, and not to hurt or kill the plant 65 at the same time. If the application of Dragon Juice 50 is only from the top of the plant 65 the lack of coating or wetting the leaf bottoms 80 and stalk 70 will not eradicate or repel or kill as effectively. It will still promote plant 65 and root growth and maintain a better level of plant health.

c) Spray DRAGON JUICE 50 up to 2 times daily on vegetative plants 65 or seedlings with roots. The more you spray the more results you will get. The plants 65 are simply healthier and grow more effectively. If you spray as little as twice a week you will still see noticeable positive growth results on most garden and food bearing plants 65. If you are using Dragon Juice 50 on nonflowering house plants such as vine plants or shrubs, or small trees growth will not be as noticeable based on the plant species. On flowering plants 50 spray once daily at most, or average 4-5 time weekly.

d) The DRAGON JUICE 50 spray concentrate can also be mixed up to 1 ounce per gallon and used as a soil drench to promote more nutrient uptake and promote even more root and plant 65 growth than applying as a foliar fertilizer. Recommended usage for a soil drench is on a monthly feeding schedule.

e) Rinse or wash plant and or vegetables before drying or consuming to remove any DRAGON JUICE 50 residue.

More Severe Application with Mold or Mildew

When using DRAGON JUICE 55 for Powdery Mildew or Mold—Use the optional ingredients listed (Bicarbonates and additional canola oil) to kill and prevent mold and powdery mildew more effectively. This version of the product is called "PM2" 55. Apply to all parts of the plant 65 to insure the plant is wet on the stalk 70 and both sides 80, 85 of the leaves 75. If the plant 65 has open flowers, spray the flowers on all sides as well. Spray into the flowers to wash out or kill the mold. Wait until the plants 65 dry and recheck the applied area. Spray only the affected areas the second pass. Daily use of "PM2" 55 is not recommended and reapplication should occur every 6 to 10 days. Too many applications will cause the plant to suffer by sealing the stomata inlets causing the flowers and leaves to expire prematurely. Although DRAGON JUICE 50 products are non-photo toxic, "PM2" 55 versions and FIRE 60 versions of DRAGON JUICE are recommended to spray at night or when lights are off for to be more effective as a wetting and delivery agent. PM2 55 stays wet on the leaves longer to produce better desired results. Example is that the Powdery Mildew dies quicker and does not return to the plant as fast.

Harvest Application

When using DRAGON JUICE for plant finishing or preharvest acceleration. DRAGON JUICE FIRE 60 is a product created with the same base ingredients but has more hydrogen peroxide to vary the plant 65 effects causing the plant to over stimulate and ripen or shut down the plant 65 down on a scheduled harvest date. This product is called DRAGON JUICE FIRE 60. The application of DRAGON JUICE FIRE 60 will also cause the plant to produce more essential oil and trichomes resulting in more enhanced flavor. Do not spray any plants 65 that you do not want to prematurely harvest. Use and soak entire plant using described method for "Normal Application" for composition 50. Spray Dragon Juice Fire 60 for 10 and 9 days before harvest date desired. Spray Dragon Juice Fire 60 for 5 and 4 days before harvest date desired.

The plant 65 will show less chlorophyll in the leaves and the plant 65 stops taking up nutrients and most water. By the end of 10 days the plant 65 will appear significantly different than an exact same plant that Dragon Juice Fire 60 that has not been applied. The purpose of using Dragon Juice Fire 60 is to help or to eliminate the need to flush the plant from using synthetic nutrients. It slows the nutrients movement through over stimulation. The plant 65 uses the rest of it local nutrients and creates an appearance of fall colors throughout the garden just like the trees outside in fall weather. Also by utilizing the plants 65 nutrients it causes better flavor and a more sustainable product. Fire 60 is also used as a total eradication process of insects because of the compounds strength. Fire 60 is a great last minute bug kill or fungus kill Again this is a product 60 that can be used as a tool on the last day of harvest to reclaim bug infested areas or rejuvenate the plant where moldy problems occur. As Fire 60 is water soluble it can be rinsed off without any toxic after effects.

Referring to FIGS. 1 to 5, the method of applying a plant conditioner composition 50 to a plant 65 is shown, wherein the composition 50 application to the plant 65 comprising the steps of firstly providing the plant conditioner composition 50 that includes the distilled water, the dextrose component, the molasses component, the honey component, the vitamin B component, the orange oil component, the lemon oil component, the tea tree oil component, the hydrogen peroxide component, and the organic detergent component. A next step of providing the plant 65 that includes the stalk 70, the area of soil 90 surrounding the stalk 70, also the plurality of leaves 75 wherein each leaf 75 includes a leaf underside 80 and a leaf topside 85. A further step of providing an apparatus 105 that is operational to selectively direct an atomizing spray 100 of the plant conditioner composition 50 at the plant 65, see FIG. 1. Next a step of directing 110 the spray 100 to lightly wet the soil area 90 surrounding the stalk 70, see FIG. 5. Further a step of directing 115 the spray 100 to completely wet the stalk 70, see FIG. 2. Continuing a step of grasping 130 the stalk 70 being positioned at a stalk 70 and soil area 90 interface 95, forming a loose grip 135 about the stalk 70, see FIG. 3.

Further a step of sliding 140 the grip 135 along the stalk 70 away from the stalk 70 and soil area 90 interface 95 to laterally expose 145 the leaf undersides 80 to direct 120 the spray 100 to completely wet the leaf undersides 80 of the lateral grouping of leaves 75, wherein lateral grouping of leaves 75 means that the leaf 75 grouping that first has in underside 80 sprayed 100 and that same leaf 75 has its topside 85 sprayed 100, see FIGS. 3 and 4, wherein a plurality of leaves 75 lateral grouping are leaves that are in the same or similar horizontal plane so that the sliding 140 loose grip 135 laterally exposes 145 the undersides 80 and the topsides 85 simultaneously, FIGS. 2 to 5 show a minimal number of leaves 75 for pictorial clarity. Next the step of continuing to slide 140 the grip 135 along the stalk 70 further away from the stalk 70 and soil area 90 interface 95 such that the leaf topsides 85 are laterally exposed 150 to direct 125 spray 100 to completely wet the leaf topsides 85 of the lateral grouping of leaves, in going from FIG. 3 to FIG. 4. Next a step of repeating the prior steps until all of the leaf undersides 80 and leaf topsides 85 are wetted with the composition 50, no more than about twice daily.

In addition, when the plant 65 further has a plurality of open flowers, each open flower shall have the spray 100 directed to completely wet the open flower on all sides no more than about once daily. Also, an optional step of a soil drench 100 via applying the plant conditioner composition 50 directly to the soil 90 to thoroughly wet the soil 90 no more than about once monthly, see FIG. 5. Another optional step for the method of applying a plant conditioner 55 composition to the plant 65 wherein the plant conditioner composition 55 further comprises a sea salt, a sodium bicarbonate, a potassium bicarbonate, and a canola oil forming a mold reduction composition 55 wherein the previous steps are repeated with the mold reduction composition 55 no more than about once about every six to ten days. Further, an optional step for the method of applying a plant conditioner composition 60 to the plant 65 wherein the plant conditioner composition 60 further comprises about ten times an amount of hydrogen peroxide forming a pre harvest composition 60 wherein the previous steps are completed with the pre harvest composition 60 no more than about twice at about nine and ten days prior to harvest and no more than twice at about four to five days prior to harvest.

Conclusions, Ramifications and Scope

A number of changes are possible to the chemicals, methods, and uses described above while still remaining within the scope and spirit of the invention. The specifics about the form and use of the invention described in this application (including the specifics in the Background, Field, Related Art, Summary, Purposes and Advantages, Abstract, Preferred Embodiment, Additional Embodiments, and Alternative Embodiments, etc.) are examples and are not intended to be limiting in scope. Those skilled in the art will recognize certain variations, modifications, permutations, additions, subtractions and sub-combinations thereof, and may discover new fields of use. The scope of the invention is to be determined by the claims and their legal equivalents, not the examples, purposes, summary, preferred embodiments, alternative or additional embodiments, operation, tests, parameters, or limitations etc. given above. It is intended that the claims are interpreted to include all such variations, modifications, additions, subtractions, permutations and sub-combinations as are within their true spirit and scope, including those which may be recognized later by those skilled in the art. Even though particular combinations of features are recited in the claims or disclosed in the specification, these combinations are not intended to limit the invention. In fact, many of these features may be combined in ways not specifically recited in the claims or disclosed in the specification. No element, act, or instruction used in the present application should be construed as critical or essential to the invention unless explicitly described as such. Also, as used herein, the article "a" is intended to include one or more items. Where only one item is intended, the term "one" or similar language is used.

CONCLUSION

Accordingly, the present invention of a plant conditioner composition 50, 55, 60 and method of making and method of using has been described with some degree of particularity directed to the embodiments of the present invention. It should be appreciated, though; that the present invention is defined by the following claims construed in light of the prior art so modifications or changes may be made to the exemplary embodiments of the present invention without departing from the inventive concepts contained therein.

The invention claimed is:

1. A plant conditioner composition for a plant, said composition comprising by volume about:
   (a) 48.8% distilled water;
   (b) at least three carbohydrates selected from the group consisting of 21.7% molasses, 7.2% honey, and 14.5% dextrose;
   (c) 0.22% vitamin B;
   (d) 0.44% orange oil;
   (e) 0.14% lemon oil;
   (f) 2.25% tea tree oil;
   (g) 2.7% hydrogen peroxide;
   (h) 1.4% organic detergent;
   (i) 0.14% canola oil to act as wetting agent;
   (j) 0.23% sodium bicarbonate to further control molds and fungus;
   (k) 0.23% potassium bicarbonate to further control molds and fungus and release potassium to the plant; and
   (l) 0.05% sea salt to further break down a selenium compound present in proximity to the plant.

2. A plant conditioner composition according to claim 1 wherein said vitamin B is a vitamin B complex that consists of thiamine, riboflavin, niacin, pantothenic acid, pyridoxine, biotin, folic acid, and cyanocobalamin.

3. A method of making a plant conditioner composition for a plant, said composition comprising the steps of:
   (a) providing distilled water, dextrose powder, molasses, honey, vitamin B, orange oil, lemon oil, tea tree oil, hydrogen peroxide, and organic detergent all as separate items;
   (b) heating said dextrose powder with said distilled water to form a clear mixture of dextrose and distilled water, said heating of said dextrose powder and distilled water solution is to be done for about six to nine minutes to a maximum temperature of one-hundred ninety degrees Fahrenheit;
   (c) adding said molasses to said clear mixture of dextrose and distilled water forming a mixture of dextrose, molasses, and distilled water;
   (d) cooling said mixture of dextrose, molasses, and distilled water;
   (e) adding said honey to said cooled mixture of dextrose, molasses, and distilled water forming a cooled mixture of honey, dextrose, molasses, and distilled water;
   (f) adding additional of said distilled water to said cooled mixture of honey, dextrose, molasses, and distilled water;
   (g) adding said vitamin B to said cooled mixture of honey, dextrose, molasses, and distilled water to form a mixture of honey, dextrose, molasses, distilled water, and vitamin B;
   (h) forming a separate mixture of said orange oil, said lemon oil, and said tea tree oil which forms an oil mixture;
   (i) adding said oil mixture to said cooled mixture of honey, dextrose, molasses, distilled water, and vitamin B while simultaneously adding said hydrogen peroxide to said cooled mixture of honey, dextrose, molasses, distilled water, and vitamin B to form a combination of said oil mixture, said hydrogen peroxide, and said cooled mixture of honey, dextrose, molasses, distilled water, and vitamin B; and
   (j) adding said organic detergent to said combination of said oil mixture, said hydrogen peroxide, and said cooled mixture of honey, dextrose, molasses, distilled water, and vitamin B.

4. A method of making a plant conditioner composition according to claim 3 wherein said step of cooling further includes cooling said dextrose, molasses, and distilled water solution to a temperature of about seventy to one hundred degrees Fahrenheit.

5. A method of making a plant conditioner composition according to claim 4 wherein said plant conditioner composition that includes said organic detergent, oil mixture, hydrogen peroxide, honey, dextrose, molasses, vitamin B, and distilled water, shall be stored in a ventilated container for a time period of about six to ten days, wherein simultaneously said plant conditioner composition shall be agitated within said ventilated container to facilitate outgassing of said plant conditioner composition for said six to ten day time period, wherein subsequent to said six to ten day time period said ventilated container containing said plant conditioner composition can be sealed and non-ventilated.

6. A method of making a plant conditioner composition according to claim 4 further comprising components of sea salt, sodium bicarbonate, potassium bicarbonate, and canola oil, wherein said added components of sea salt, sodium bicarbonate, potassium bicarbonate, and canola oil are added prior to said step of adding said organic detergent.

7. A method of making a plant conditioner composition according to claim 6 wherein said plant conditioner composition that includes said organic detergent, oil mixture, hydrogen peroxide, honey, dextrose, molasses, vitamin B, distilled water, sea salt, sodium bicarbonate, potassium bicarbonate, and canola oil shall be stored in a ventilated container for a time period of about six to ten days, wherein simultaneously said plant conditioner composition shall be agitated within said ventilated container to facilitate outgassing of said plant conditioner composition for said six to ten day time period, wherein subsequent to said six to ten day time period said ventilated container containing said plant conditioner composition can be sealed and non-ventilated.

8. A method of applying a plant conditioner composition to a plant, said composition application to the plant comprising the steps of:
(a) providing said plant conditioner composition that includes distilled water, dextrose, molasses, honey, vitamin B, orange oil, lemon oil, tea tree oil, hydrogen peroxide at about ten times a normal amount of said hydrogen peroxide forming a pre harvest composition, and organic detergent;
(b) providing said plant that includes a stalk, an area of soil surrounding said stalk, a plurality of leaves wherein each said leaf includes a leaf underside and a leaf topside;
(c) providing an apparatus that is operational to selectively direct an atomizing spray of said plant conditioner composition at the plant;
(d) directing said spray to lightly wet said soil area surrounding said stalk;
(e) directing said spray to completely wet said stalk;
(f) grasping said stalk being positioned at a stalk and soil area interface, forming a loose grip about said stalk;
(g) sliding said grip along said stalk away from said stalk and soil area interface to laterally expose said leaf undersides to direct said spray to completely wet said leaf undersides of a lateral grouping of leaves;
(h) continuing to slide said grip along said stalk further away from said stalk and soil area interface such that said leaf topsides are laterally exposed to direct said spray to completely wet said leaf topsides of said lateral grouping of leaves; and
(i) repeating said steps (d), (e), (f), (g), and (h) no more than about twice at about nine and ten days prior to harvest and no more than twice at about four to five days prior to harvest.

9. A method of applying a plant conditioner composition to a plant according to claim 8 wherein said plant further has a plurality of open flowers, wherein each said open flower shall have said spray directed to completely wet said open flower on all sides no more than about once daily.

10. A method of applying a plant conditioner composition to a plant according to claim 8 further comprising a step of a soil drench via applying said plant conditioner composition directly to said soil to thoroughly wet said soil no more than about once monthly.

11. A method of applying a plant conditioner composition to a plant according to claim 8 wherein said plant conditioner composition further comprises sea salt, sodium bicarbonate, potassium bicarbonate, and canola oil forming a mold reduction composition wherein said steps (d), (e), (f), (g), and (h) are completed with said mold reduction composition no more than about once about every six to ten days.

12. A plant conditioner composition for a plant, said composition comprising by volume about:
(a) 49.1% distilled water;
(b) at least three carbohydrates selected from the group consisting of 21.8% molasses, 7.3% honey, and 14.6% dextrose;
(c) 0.22% vitamin B;
(d) 0.44% orange oil;
(e) 0.14% lemon oil;
(f) 2.3% tea tree oil;
2.7% hydrogen peroxide; and
1.4% organic detergent.

* * * * *